May 12, 1959 G. A. LYON 2,886,376
WHEEL COVER
Filed June 1, 1954
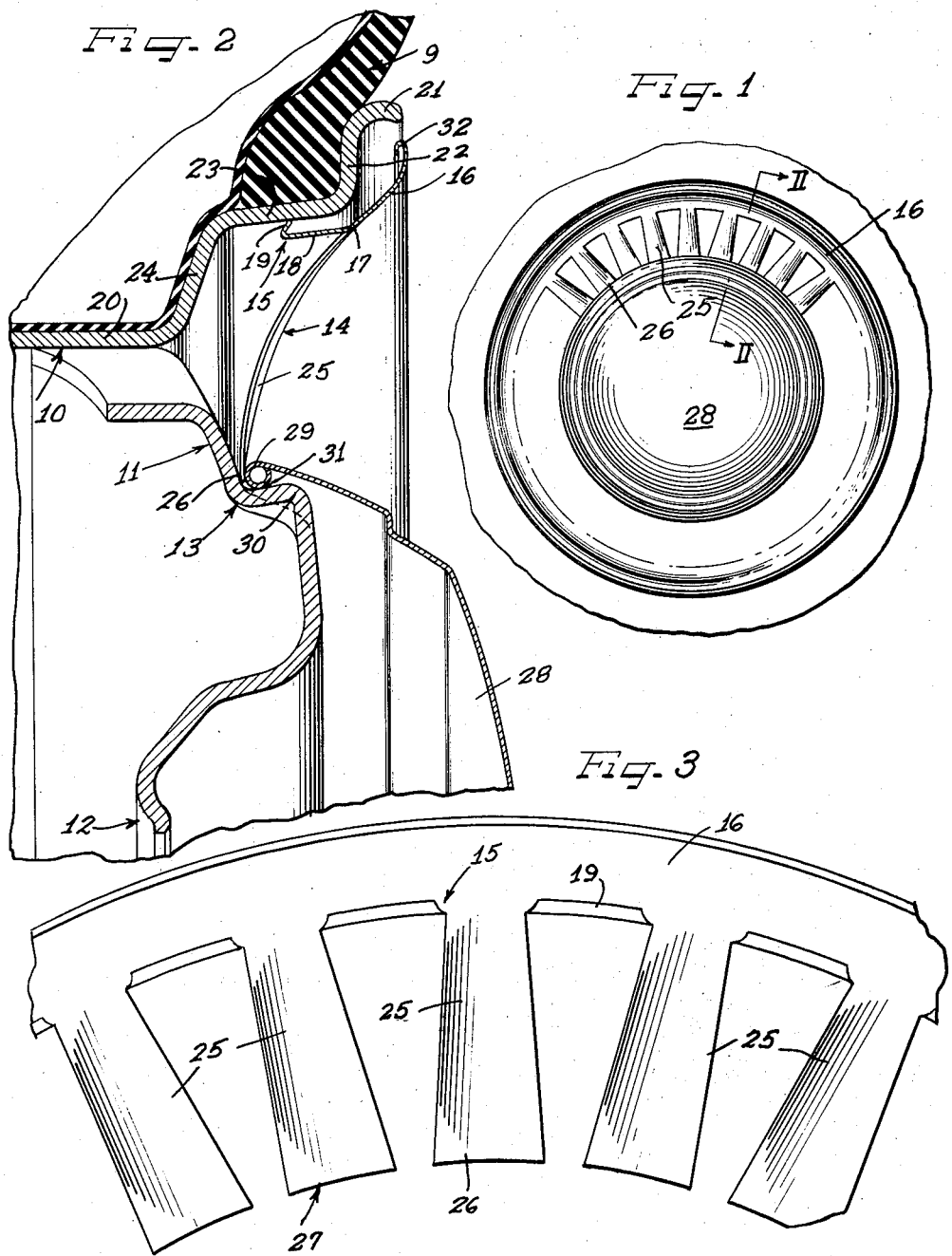
Inventor
GEORGE ALBERT LYON

United States Patent Office

2,886,376
Patented May 12, 1959

2,886,376

WHEEL COVER

George Albert Lyon, Detroit, Mich.

Application June 1, 1954, Serial No. 433,516

9 Claims. (Cl. 301—37)

This invention relates to wheel trim structures and, more particularly, to a trim ring having spoke simulating elements.

At the present time there has been a revival of the so-called wire spoke wheels due to the demand on the part of the automobile industry for a cover having a different appearance. Coincident with this demand for a new appearance, there is a present trend due to the closeness of competition, to cut cost in the production of cover structures. The present invention relates to a wheel trim ring equipped with spoke-like elements which are maintainable on the rim of the wheel by spring fingers and is further secured at the radially inner ends of the spokes by a snap-on conventional hub cap.

An object of this invention is to provide a novel and highly ornamental wheel structure.

A further object of this invention is to provide a wheel trim ring having spoke-like elements which lends itself to economical manufacture on a large production scale from sheet material such, for example, as light-weight steel strip.

In accordance with the general features of this invention, there is provided a cover structure for a wheel including a flanged tire rim and a body part with a protruding central portion, a circular wheel trim for disposition between the rim and central body portion, including an annular portion for bearing on the tire rim, and spaced spoke-like elements projecting radially from the annular portion and having their free inner ends resiliently bottomed on the central portion.

Another feature of this invention relates to providing the annular portion of the wheel trim with a plurality of resilient cover retaining fingers projecting generally axially rearwardly from the annular portion for gripping a flange of the wheel rim.

A still further feature of this invention relates to providing a wheel trim ring having spoke-like elements supportable by a protruding central portion on the body part, the ends of the spoke-like elements being resiliently held in place by the snapping on of a hub cap over the protruding central portion into engagement with the spoke-like elements.

Other objects and features of this invention will more fully appear from the following detailed description taken in connection with the accompanying drawings which illustrate a single embodiment thereof and in which:

Figure 1 is a fragmentary side elevational view of an automobile wheel structure with a trim ring equipped with my novel spoke-like elements;

Figure 2 is an enlarged fragmentary cross sectional view taken substantially on the line II—II of Figure 1 looking in the direction indicated by the arrows; and Figure 3 is a fragmentary side view of my novel wheel trim ring as viewed from the axially inner or underside portion of the ring.

As shown on the drawings:

The wheel illustrated in the accompanying drawing is of a so-called conventional drop center type and includes the usual pneumatic tire and tube assembly 9, a multiflange tire rim 10 and a central dished wheel body or spider 11 on which the base of the rim is secured and carried. The central portion of the body part 11 is dished at 12 for detachably fastening in the usual way to the brake drum (not shown) or the like on an automobile axle. Any suitable means, such, for example, as bolts or capscrews (not shown) may be used or holding the wheel in place.

It will be best seen in Figure 2 that the central body part 11 has a protruding central annular shoulder 13 which will be discussed in detail in connection with providing retaining means for the subject of my invention.

My invention is concerned with providing a dress or appearance for this wheel which will cause it to look like an entirely different wheel, or, more specifically, like the revived conventional wire spoke wheel.

Now, I have designated generally my novel wheel trim ring by the reference character 14. It may be made from any suitable sheet material, although I preferably propose to make it in the form of a metallic annulus rolled or stamped from sheet or strip steel, such, for example, as stainless steel strip. I not only propose to provide a wire spoke simulating rim but also, in addition, I propose to provide the trim 14 with integrally spaced retaining fingers or clips 15 projecting axially inwardly from an outer radially axially inwardly sloping peripheral annular portion 16 constituting a substantial part of the trim 14. The fingers 15 are all identical so that a description of one suffices for all.

While it is obvious many different types of trim retaining fingers might suitably be employed with my novel trim 14, I have, for purposes of exemplification, illustrated a preferred type of retaining finger or clip 15.

It will be best seen from Figure 2 that my retaining finger 15 is integrally connected at 17 to the annular portion 16. The finger 15 comprises a generally axially extending leg 18 terminating in a relatively stiff short angular leg 19 turned and inclined generally radially outwardly over the longer leg 18 for ring retaining engagement with tire rim 10.

In Figure 2, it will be perceived that the tire rim 10 is of a stepped construction and is suitably fastened at 20 to the central wheel body part 11. The rim 10 comprises an axially outer terminal flange 21 integrally and successively connected to a radially extending flange 22, an axially extending intermediate flange 23 and a third generally radially extending flange 24 leading to the connection 20 holding the rim 10 and the wheel body 11 together.

From Figure 2, it will be seen that the terminal leg 19 of each of my retaining fingers 15 is adapted to progressively slide along the intermediate flange 23 for holding the trim ring 14 in detachable resilient trim retaining engagement with the rim 10. The gripping edges of finger legs 19 are normally all substantially disposed in a common circle of a diameter slightly greater than that of the portion of rim flange 23 engaged thereby so as to require stressing of the fingers as they are forced along the surface of inclined flange 23 in the application of the trim ring to the wheel.

Referring now to the spoke construction, it will be seen in Figure 1 that my novel trim ring 14 is provided with a plurality of generally radially inwardly extending resilient spoke simulating elements 25 connected to the radially outer annular portion 16.

Figure 3 illustrates how the spokes 25 have been circularly spaced so as to alternate with the underturned resilient fingers 15; the material cut from between the spokes being employed to form the fingers or clips 15.

In Figures 2 and 3, it will be seen that the inner ends 26 of the spokes 25 form an interrupted inner circular surface 27 adapted, when engaged on the wheel body part 11, to rest or bottom on the annular shoulder 13 of the wheel body part 11.

After the trim 14 has been pushed axially onto the wheel and firmly secured to the rim 10 by the retaining fingers 15, and the spokes 25 have been bottomed against the shoulder 13 of the body part 11, the shoulder 13 is further adapted to receive a hub cap 28.

The sheet metal hub cap 28 has on its outer periphery a curled under continuous annular resilient edge 29, which is adapted to be forced over spaced bumps 30 on the body part 11 into resilient detachable engagement therewith. Each of the bumps 30 is undercut at 31 adjacent shoulder 13 so that the resilient edge 29 of hub cap 28 can drop into same for tight retaining engagement with the bumps.

It is seen in Figure 2 that as the hub cap 28 is forced into bottomed relation relative to the shoulder 13, it also clampingly engages the radially inner ends 26 of the spokes 25 thereby to resiliently wedge the ends 26 against the body part 11.

The hub cap 28 is easily detachable from gripping engagement with bumps 30 by inserting the end of a screw driver (not shown) under edge 29 and by forcibly dislodging said edge from said bumps 30.

The trim ring 14 has a reinforced turned outer edge 32 normally spaced from terminal rim flange 21 when the ring is on the wheel. This edge serves as a pry-off edge under which the end of a screw driver may likewise be inserted for prying the ring off of the wheel after removal of hub cap 28. Such a pry-off force serves to deflect resiliently the fingers 15 from gripping engagement with rim flange 23 without permanently distorting the fingers so that the ring can be repeatedly applied to and removed from the wheel if so desired.

It will be understood that modifications and variations may be effected without departing from the scope of the novel concepts of the present invention.

I claim as my invention:

1. In a wheel structure, a wheel including a flanged tire rim and a body part with a protruding central portion, a circular wheel trim for disposition between said rim and central body portion including an annular portion for bearing on said tire rim and spaced spoke-like elements projecting radially from said annular portion in axially spaced overlying relation to said wheel and having their free inner ends resiliently deflected over and bottomed behind said central portion in snap-on, pry-off detachable assembly to prevent axial displacement, said annular portion having projecting rearwardly therefrom at its inner margin adjacent juncture of said spoke-like elements a plurality of resilient cover retaining fingers for gripping a flange of said rim, said fingers alternating with said spoke elements and each including a comparatively longer generally axial leg terminating in a short stiff angular end inclined radially outwardly over said axial leg for sliding and gripping engagement with the wheel rim flange.

2. In a wheel structure, a wheel including a flanged tire rim, a body part with a protruding central portion, and a hub cap detachably associated with said central portion, a circular wheel trim for disposition between said rim and central body portion including an annular portion for bearing on said tire rim and spaced spoke-like elements projecting radially from said annular portion in axially spaced overlying relation to the tire rim and the adjacent portion of the wheel body part and having their free inner ends resiliently deflected over and bottomed behind said central portion in snap-on, pry-off assembly to prevent axial displacement, said free ends of said spoke elements being clamped to said body part by said hub cap.

3. In a wheel structure, a wheel including a flanged tire rim, a body part with a protruding central portion, and a hub cap detachably associated with said central portion, a circular wheel trim for disposition between said rim and central body portion including an annular portion for bearing on said tire rim and spaced spoke-like elements projecting radially from said annular portion in axially spaced overlying relation to the tire rim and the adjacent portion of the wheel body part and having their free inner ends resiliently deflected over and bottomed behind said central portion in snap-on, pry-off assembly to prevent axial displacement, said free ends of said spoke elements being clamped to said body part by said hub cap, said hub cap having a turned edge in snap-on engagement with said central portion and bearing against the free ends of said spoke-like elements on said central portion.

4. In a wheel structure including a wheel having a drop center tire rim part having an intermediate axial rim flange and a body part connected to said tire rim defining a gap between the parts and with a protruding portion on the body part, a circular wheel trim for disposition over said rim and body part in self-retained assembly therewith including a generally radially inwardly extending trim portion spanning the gap in overlying axially spaced relation to the connection between the parts, and said trim portion being divided up into a plurality of resiliently deflectable spoke-like elements spaced axially of the wheel with the ends of the elements having a smaller diameter than the diameter of the protruding portion and with the ends being deflected over and engaged behind the protruding portion in snap-on, pry-off assembly with the wheel.

5. In a wheel structure including a wheel having a drop center tire rim part having an intermediate axial rim flange and a body part connected to said tire rim defining a gap between the parts and with a protruding portion on the body part, a circular wheel trim for disposition over said rim and body part in self-retained assembly therewith including a generally radially inwardly extending trim portion spanning the gap in overlying axially spaced relation to the connection between the parts, said trim portion being divided up into a plurality of resiliently deflectable spoke-like elements spaced axially of the wheel with the ends of the elements having a smaller diameter than the diameter of the protruding portion and with the ends being deflected over and engaged behind the protruding portion in snap-on, pry-off assembly with the wheel, and a hub cap member detachably associated with said protruding portion urging and clamping the ends of said spoke like elements against the wheel.

6. In a wheel structure including a wheel having a drop center tire rim part having an intermediate axial rim flange and a body part connected to said tire rim defining a gap between the parts and with a protruding portion on the body part, a circular wheel trim for retained disposition over said rim and body part including an outer annular portion and a generally radially inwardly extending trim portion spanning the gap in overlying axially spaced relation to the connection between the parts, said radially inwardly extending trim portion being divided up into a plurality of spoke-like elements spaced axially of the wheel with the inner end of said trim portion having a diameter slightly smaller than the diameter of the protruding portion and with the trim portion resiliently deflected behind the protruding portion in snap-on, pry-off assembly to preclude axial displacement, and said trim having at least some of the cover material turned from between said elements at the junction of said trim portions providing circumferentially spaced resilient cover retaining fingers in snap-on, pry-off engagement with the tire rim.

7. In a wheel structure including a wheel having a drop center tire rim having an axial rim flange and a body part connected to said tire rim defining a gap between the parts and with shoulder structure on the body part, a circular wheel trim for retaining disposition over said rim and body part including an outer annular portion and a generally radially inwardly extending trim portion spanning the gap in overlying axially spaced relation to the connection between the parts, said radially inwardly extending trim portion being divided up into a plurality of spoke-like elements spaced axially from the wheel with a radially inner end area of said ring portion detachably engaged behind the shoulder structure against axial displacement, said trim portion having at least some of the cover material turned from between said elements at the junction of said annular and trim portions providing circumferentially spaced resilient cover retaining extensions in detachable engagement with the tire rim, and a hub cap having an outer terminal edge retainingly engaged over and behind said shoulder structure in abutment against the radially inner end area of the trim ring firmly securing the end area in place and thereby affording a firm back up for the resilient cover retaining extensions.

8. In a wheel structure including a wheel having a drop center tire rim part having an axial rim flange and a body part connected to said tire rim defining a gap between the parts and with shoulder structure on the body part, a circular wheel trim for retaining disposition over said rim and body part including an outer annular portion and a generally radially inwardly extending trim portion spanning the gap in overlying axially spaced relation to the connection between the parts, said radially inwardly extending trim portion being divided up into a plurality of spoke-like elements spaced axially from the wheel with a deflectable radially inner end area of said ring portion being deflectably engaged against axial displacement behind the shoulder structure, and at least some of the cover material turned from between said elements at the junction of said annular and trim portions providing circumferentially spaced resilient cover retaining extensions in detachable engagement with the tire rim.

9. In a wheel structure including a wheel having a drop center tire rim part having an axial rim flange and a body part connected to said tire rim defining a gap between the parts, a circular wheel trim for retaining disposition over said rim and body part including an outer annular portion and a generally radially inwardly extending trim portion spanning the gap in overlying axially spaced relation to the connection between the parts, said radially inwardly extending trim portion being divided up into a plurality of radially extending spoke-like elements spaced axially from the wheel with a radially inner end area of said ring portion bottomed against the body part, said trim having at least some of the cover material turned from between said elements at the junction of said annular and trim portions providing circumferentially spaced resilient cover retaining extensions in detachable engagement with the tire rim.

References Cited in the file of this patent

UNITED STATES PATENTS

| Re. 22,428 | Lyon | Feb. 1, 1944 |
| 2,504,995 | Lyon | Apr. 25, 1950 |
| 2,544,703 | Lyon | Mar. 13, 1951 |
| 2,624,633 | Lyon | Jan. 6, 1953 |